(12) United States Patent
Ogishima et al.

(10) Patent No.: US 10,530,197 B2
(45) Date of Patent: Jan. 7, 2020

(54) NONCONTACT POWER TRANSMISSION APPARATUS AND POWER TRANSMISSION DEVICE

(71) Applicant: TOSHIBA TEC KABUSHIKI KAISHA, Shinagawa-ku, Tokyo (JP)

(72) Inventors: Takuya Ogishima, Shizuoka (JP); Masakazu Kato, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 130 days.

(21) Appl. No.: 15/907,611

(22) Filed: Feb. 28, 2018

(65) Prior Publication Data

US 2018/0278098 A1 Sep. 27, 2018

(30) Foreign Application Priority Data

Mar. 23, 2017 (JP) ................................. 2017-057961

(51) Int. Cl.
| | |
|---|---|
| *H02J 50/90* | (2016.01) |
| *H02J 50/10* | (2016.01) |
| *H02J 7/00* | (2006.01) |
| *H02J 7/02* | (2016.01) |
| *B41J 2/35* | (2006.01) |
| *B41J 3/36* | (2006.01) |

(52) U.S. Cl.
CPC ............ *H02J 50/90* (2016.02); *H02J 7/0047* (2013.01); *H02J 7/025* (2013.01); *H02J 50/10* (2016.02); *B41J 2/35* (2013.01); *B41J 3/36* (2013.01)

(58) Field of Classification Search
CPC combination set(s) only.
See application file for complete search history.

(56) References Cited

U.S. PATENT DOCUMENTS

| 8,664,914 B2 | 3/2014 | Toya et al. |
| 2013/0038279 A1 | 2/2013 | Seyerle et al. |

FOREIGN PATENT DOCUMENTS

| JP | 2003-157907 A | 5/2003 |
| JP | 2014-233111 A | 12/2014 |
| WO | WO-2014/148742 A1 | 9/2014 |

OTHER PUBLICATIONS

Search Report dated Aug. 20, 2018 received in corresponding European application No. 18162781.1, 10 pages.

*Primary Examiner* — Robert L Deberadinis
(74) *Attorney, Agent, or Firm* — Foley & Lardner LLP

(57) ABSTRACT

A noncontact power transmission apparatus includes an instrument including a first case, a power reception coil arranged to generate an induced current due to magnetic flux in a first direction intersecting a gravitational direction, and a holder configured to hold the power reception coil at a predetermined distance from an outer surface of the first case in the first case. A power transmission device includes a conductive second case that has an opening into which the instrument is inserted in which the instrument is stored, a power transmission coil provided in the second case so as to generate magnetic flux in the first direction, and disposed to generate an induced current in the power reception coil, and an elastic body that is provided in the second case, maintains a distance between the power transmission coil and the power reception coil to be constant, and supports the power transmission coil.

17 Claims, 11 Drawing Sheets

NONCONTACT POWER TRANSMISSION APPARATUS AND POWER TRANSMISSION DEVICE

CROSS-REFERENCE TO RELATED APPLICATION

This application claims the benefit of and priority to Japanese Patent Application No. P2017-057961, filed Mar. 23, 2017, the entire contents of which are incorporated herein by reference.

FIELD

Exemplary embodiments described herein relate to a noncontact power transmission apparatus used for an instrument such as a portable thermosensitive recording apparatus.

BACKGROUND

A portable terminal apparatus such as a smart phone has a secondary battery which is chargeable and built thereinto. A charging AC adaptor is connected to the portable terminal apparatus in a wired manner, and charges the secondary battery. In recent years, a noncontact charging function has been installed in a portable terminal apparatus. The portable terminal apparatus includes a power reception coil receiving power, a power reception circuit generating power through the power reception coil, a charging circuit charging a secondary battery, and the like, and thus realizes a noncontact charging function. The noncontact charging function applies noncontact power transmission in which power is transmitted from a power transmission coil in a noncontact manner, and the power is received by a power reception coil.

Regarding the noncontact power transmission, a method is widely used in which power is transmitted through electromagnetic induction between a power transmission coil provided in a power transmission device and a power reception coil provided in a portable terminal apparatus. A frequency bandwidth used for electromagnetic induction is about 100 kHz to 200 kHz. A charging stand has a noncontact power transmission function. A surface of the portable terminal apparatus is planar, and thus a surface of the charging stand, which is a power transmission device on which the portable terminal apparatus is placed is also planar. If the portable terminal apparatus is placed at any position on the surface of the charging stand, the charging stand detects a position of the portable terminal apparatus, moves the power transmission coil such that the power transmission coil and the power reception coil have an optimal positional relationship, and then charges the portable terminal apparatus. Fine position adjustment is further performed during charging, and thus power transmission efficiency is increased.

The use of a noncontact charging apparatus is not limited to a portable terminal apparatus such as a smart phone having a thin shape. Even in a portable terminal apparatus or an electronic instrument having some extent of thickness, and further having a protrusion, a secondary battery built into the portable terminal apparatus or the electronic instrument can be charged by using the noncontact charging apparatus. For example, a noncontact charging apparatus is used in a box-shaped portable electronic instrument such as a portable printer or a portable video camera, or a toy. A charging stand collectively charges a plurality of such instruments.

In a case where power is sent to an electronic instrument through noncontact power transmission, noise tends to be generated in a power transmission device or a power reception device. In order to suppress noise generated in the power transmission device and the power reception device, the power transmission device and the power reception device are surrounded by a metallic box. In order to increase power transmission efficiency, a power transmission coil built into the power transmission device and a power reception coil built into the power reception device are required to be maintained at positions separated from each other by a predetermined distance. In a case where the power transmission device and the power reception device are surrounded by the metallic box, it is hard to check whether or not the devices are held to be separated from each other by a predetermined distance from the outside of the box.

DETAILED DESCRIPTION

Figure 1:
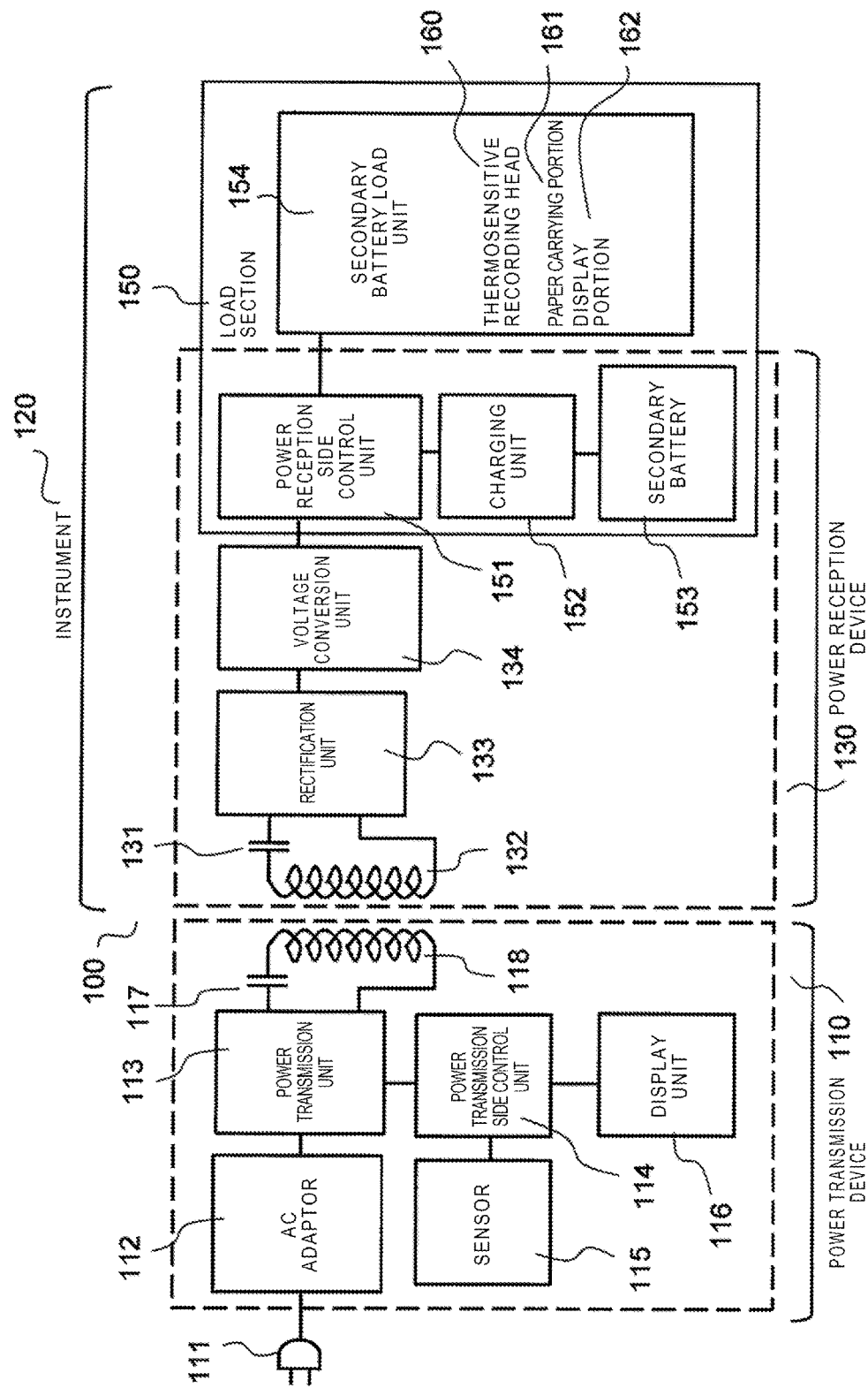
FIG. 1 is a block diagram of a noncontact power transmission apparatus according to a first exemplary embodiment.

A noncontact power transmission apparatus of some embodiments includes an instrument including a first case, a power reception coil that is disposed to generate an induced current due to magnetic flux in a first direction intersecting a gravitational direction, and a holding unit that holds the power reception coil at a predetermined distance from an outer surface of the first case in the first case; and a power transmission device including a conductive second case that has an opening into which the instrument is inserted, and stores the instrument, a power transmission coil that is provided in the second case so as to generate magnetic flux in the first direction, and is disposed to generate an induced current in the power reception coil, and an elastic body that is provided in the second case, maintains a distance between the power transmission coil and the power reception coil to be constant, and supports the power transmission coil.

Hereinafter, exemplary embodiments will be described with reference to the drawings. The same reference numeral indicates the same constituent element in the drawings.

A noncontact power transmission apparatus is formed of a power transmission device, and an instrument including a power reception device. In the present exemplary embodiment, a portable thermosensitive recording apparatus is exemplified as the instrument. The portable thermosensitive recording apparatus may be a small printing apparatus which is easily carried. Hereinafter, detailed description thereof will be made.

First Exemplary Embodiment

As illustrated in FIG. 1, a noncontact power transmission apparatus 100 is formed of a power transmission device 110, and a power reception device 130 provided in an instrument 120. FIG. 1 is a block diagram illustrating a circuit configuration of the power transmission device 110 and the power reception device 130. The instrument 120 may be a portable thermosensitive recording apparatus. The portable thermosensitive recording apparatus 120 includes a charging unit 152 which is supplied with power from the power transmission device 110 and charges a secondary battery 153 in a noncontact manner.

The power transmission device 110 is connected to an AC power source of 100 V via a plug 111. The power transmission device 110 includes an AC adaptor 112, a power transmission unit 113, a power transmission side control unit 114, a sensor 115, and a display unit 116.

The AC adaptor 112 converts AC power which is input via the plug 111 into DC power. The DC power is used to drive the power transmission side control unit 114 and the power transmission unit 113. The power transmission unit 113 is a circuit generating transmission power which is required to transmit power to the power reception device 130. The power transmission side control unit 114 includes a microcomputer controlling the power transmission device 110, and an oscillation circuit generating a power carrier for power transmission. The microcomputer may be formed of a central processing unit (CPU), a random access memory (RAM), a read only memory (ROM), and a circuit provided with input/output (I/O) ports. A frequency of a carrier for noncontact power transmission is 6.78 MHz. The sensor 115 is a limit switch, a pressure sensor, or the like. The sensor 115 detects a distance between the power transmission device 110 and the power reception device 130. The display unit 116 is a light emitting diode (LED) or a liquid crystal panel. In a case where the power reception device 130 is placed at an appropriate position for the power transmission device 110 on the basis of a detection result in the sensor 115, the LED is lit. In a case where charging of the secondary battery built into the power reception device 130 is completed, the LED is turned off. In a case where the power reception device 130 becomes distant from the power transmission device 110, the LED blinks. The power transmission unit 113 is connected in series to a power transmission capacitor 117 and a power transmission coil 118. A resonance circuit formed of the power transmission capacitor 117 and the power transmission coil 118 generates AC power with a frequency which is the same as or substantially the same as a self-resonance frequency.

As a frequency of AC power generated by the power transmission device 110, a frequency of about 100 kHz is used in a case where an electromagnetic induction method is used for power transmission, and a frequency of several MHz to several tens of MHz is used in a case where a magnetic field resonance method is used for power transmission. In a case of the magnetic field resonance method, a frequency of 6.78 MHz or 13.56 MHz is frequently used. In the present exemplary embodiment, a frequency of 6.78 MHz may be used. In the present exemplary embodiment, an operation frequency is not limited, and a wide frequency bandwidth in a case of an electromagnetic induction method, a magnetic field resonance method, or the like can be used.

In order to transmit power with high accuracy, the power transmission unit 113 is formed of a class-D amplification circuit with a switching circuit. A switching element used in a switching circuit is formed of a metal-oxide-semiconductor field effect transistor (MOSFET). A class-E amplification circuit may be used instead of the class-D amplification circuit. A gallium nitride FET (GaN FET) may be used in order to perform high frequency switching instead of the MOSFET.

The instrument 120 includes the power reception device 130 receiving power transmitted from the power transmission device 110, and a load section 150 which is operated by using received power. In the present exemplary embodiment, the load section 150 is formed of a secondary battery and a portable recording device including the secondary battery.

The power reception device 130 is a part of the portable thermosensitive recording apparatus (instrument) 120. The power reception device 130 includes a resonance circuit formed of a resonance capacitor 131 (power reception capacitor) and a resonance coil 132 (power reception coil) connected in series to each other, a rectification unit 133, a voltage conversion unit 134, a power reception side control unit 151, the charging unit 152, and the secondary battery 153. The power reception side control unit 151, the charging unit 152, and the secondary battery 153 also form the load section 150 of the portable thermosensitive recording apparatus (instrument) 120. The load section 150 further includes a secondary battery load unit 154. The secondary battery load unit 154 includes a thermosensitive recording head 160, a paper carrying portion 161, and a display portion 162.

The power reception capacitor 131 and the power reception coil 132 connected in series to each other in the power reception device 130 are set to values causing resonance at 6.78 MHz. An electromagnetic wave sent via the resonance circuit formed of the power transmission capacitor 117 and the power transmission coil 118 of the power transmission device generates an induced current in the power reception coil 132, and thus resonance occurs in the power reception capacitor 131 and the power reception coil 132. Power is generated due to the resonance in the power reception device. The power reception capacitor 131 and the power reception coil 132 are connected to the rectification unit 133. The rectification unit 133 converts an AC transmitted at 6.78 MHz into a DC. The voltage conversion unit 134 converts a voltage converted into the DC in the rectification unit 133, into a voltage for driving each unit of the load section 150.

The power reception side control unit 151 controls the charging unit 152, the thermosensitive recording head 160, the paper carrying portion 161, and the display portion 162. The charging unit 152 charges the secondary battery 153 with power obtained from the voltage conversion unit 134. The power obtained through the power reception capacitor 131 and the power reception coil 132 is used for an operation of the power reception side control unit 151, and is also used for charging of the secondary battery 153 and operations of the thermosensitive recording head 160, the paper carrying portion 161, and the display portion 162.

A self-resonance frequency of the resonance circuit formed of the power reception coil 132 and the power reception capacitor 131 of the power reception device 130 is the same as or substantially the same as a self-resonance frequency of the resonance circuit formed of the power transmission coil 118 and the power transmission capacitor 117 of the power transmission device 110. The frequencies are the same as each other, and thus power is efficiently transmitted from the power transmission side to the power reception side through electromagnetic coupling.

Figure 2:
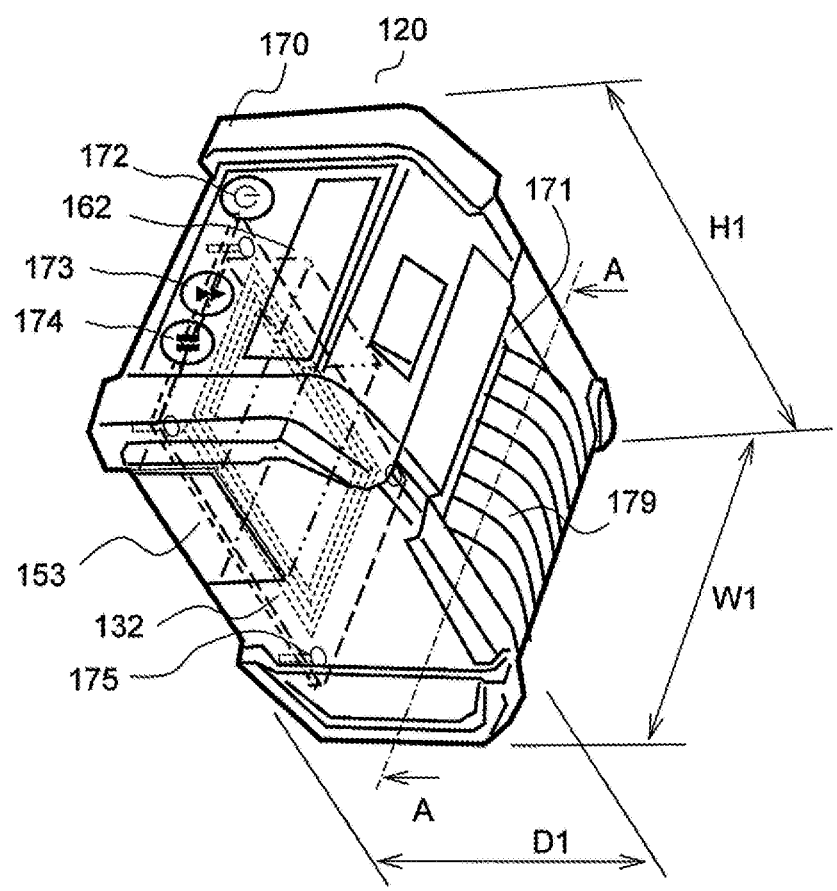
FIG. 2 is an exterior diagram of a portable thermosensitive recording apparatus according to some embodiments.
Figure 3:
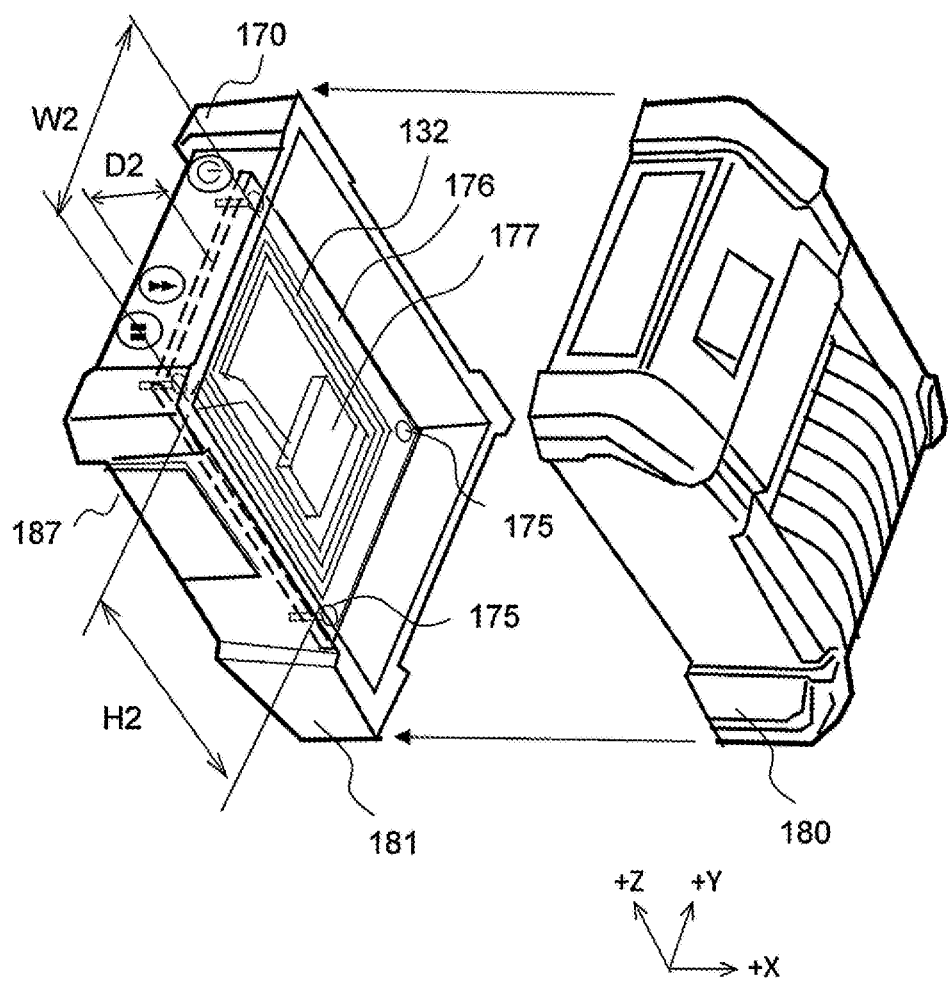
FIG. 3 is a diagram illustrating the inside of the portable thermosensitive recording apparatus according to some embodiments.
Figure 4:
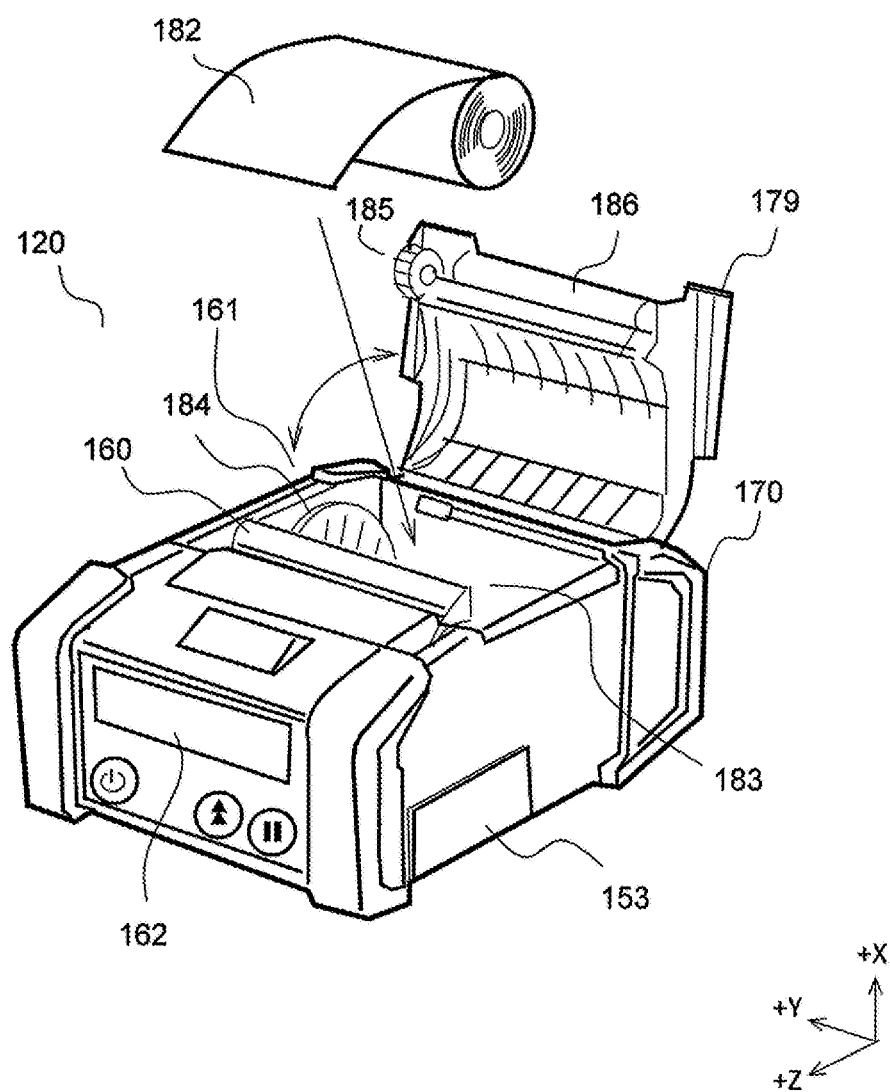
FIG. 4 is a diagram illustrating a recording unit of the portable thermosensitive recording apparatus and thermosensitive recording paper according to some embodiments.

FIG. 2 illustrates an exterior of the portable thermosensitive recording apparatus 120. FIG. 3 shows the portable thermosensitive recording apparatus 120 taken along the line III-III in FIG. 2. FIG. 3 illustrates a case where the power reception coil 132 is fixed to a case 170. FIG. 4 illustrates a state in which a cover 179 of the portable thermosensitive recording apparatus 120 is opened. Rolled paper 182 is thermosensitive recording paper with a width of 50 mm, and is stored in the case 170. The portable thermosensitive recording apparatus 120 corresponds to the instrument 120 illustrated in FIG. 1, and includes the power reception device 130 and the load section 150.

In FIG. 2, a Z axis indicates a gravitational direction. The exterior of the case 170 has a height H1 (120 mm) in a Z axis direction, a width W1 (90 mm) in a Y axis direction, and a depth D1 (70 mm) in an X axis direction. The portable thermosensitive recording apparatus 120 includes the cover 179 on an upper side in the X axis direction. The cover 179 is also used as a discharge port 171 for the printed thermosensitive recording paper 182. A power switch 172, a paper feed switch 173, and a pause switch 174 are provided on a front surface in the Z axis direction. The secondary battery 153 can be inserted into the case 170 from a side surface in the Y axis direction. The power reception coil 132 is provided inside the portable thermosensitive recording apparatus 120.

FIG. 3 illustrates a state in which the portable thermosensitive recording apparatus 120 illustrated in FIG. 2 is divided into an upper part 180 and a lower part 181 along the line III-III. A printed circuit (PC) board 176 on which a pattern of the power reception coil 132 is formed is provided in the lower part 181 of the case 170. The PC board 176 may be formed of a glass epoxy board. The pattern of the power reception coil 132 is formed by using copper foils on the PC board 176. The power reception coil 132 may be formed in a square spiral pattern of two turns with a height H2 (60 mm) and a width W2 (45 mm). The PC board 176 may be held at the case 170 with screws 175. The power reception coil 132 is provided to be parallel to a bottom 187 at a position separated from an end of the case 170 by a distance D2 (6 mm). When the portable thermosensitive recording apparatus 120 is placed on an X-Y plane, the power reception coil 132 is provided to be parallel to a Y-Z plane. In a case where the power reception coil 132 is disposed to be parallel to the Y-Z plane, and receives magnetic flux in the X axis direction, an induced current is generated. In other words, the power reception coil 132 receives magnetic flux in the direction perpendicular to the gravitational direction so as to generate an induced current. An induced current with 6.78 MHz may be generated by the power reception coil 132 and the power reception capacitor 131.

A pattern end of the power reception coil 132 is connected to a circuit 177 including the power reception capacitor 131 and the rectification unit 133. The voltage conversion unit 134 is disposed in the upper part 180, and is electrically connected to the power reception side control unit 151 and the charging unit 152.

FIG. 4 illustrates a state in which the cover 179 of the portable thermosensitive recording apparatus 120 is opened. The cover 179 is opened, and the wound thermosensitive recording paper 182 is inserted into a paper holding unit 183 of the case 170. The portable thermosensitive recording apparatus 120 includes the thermosensitive recording head 160 performing printing on thermosensitive paper, and the paper carrying portion 161 feeding the thermosensitive recording paper 182 to the thermosensitive recording head 160. The paper carrying portion 161 includes a gear 184 which is rotated by a motor (not illustrated), a gear 185 engaged with the gear 184, and a platen roller 186. The platen roller 186 is rotated by the gear 185, and thus thermosensitive paper is carried. The power reception side control unit 151 controls the thermosensitive recording head 160 to perform printing on the thermosensitive paper carried thereto according to printing data.

Figure 5:
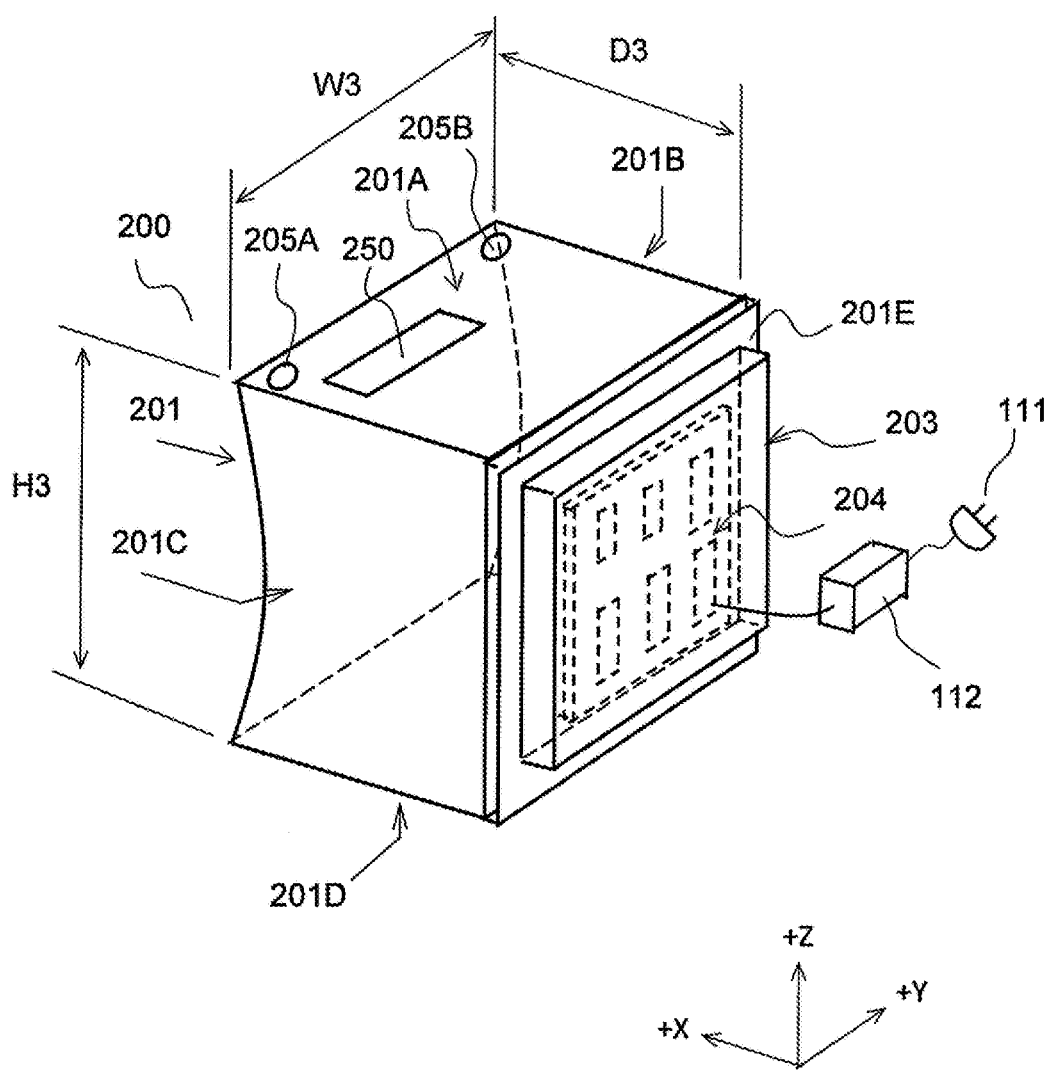
FIG. 5 is an exterior diagram of a charging box.

FIG. 5 illustrates a charging box 200 which is mounted with the power transmission device 110 and transmits power in a noncontact manner. The charging box 200 is surrounded by case surfaces 201A, 201B, 201C, 201D and 201E. Each of the case surfaces (201A to 201E) may be formed of a stainless plate with a thickness of 0.1 mm. A part of the charging box 200 is formed as an opening 201 storing the portable thermosensitive recording apparatus 120. The case surface 201A is a front surface, the case surfaces 201B and 201C are side surfaces, the case surface 201D is a mounting surface of the charging box 200, and the case surface 201E is an inner surface (rear surface). A case 203 made of stainless steel is provided on the case surface 201E, and the power transmission device 110 is provided in the case 203. A PC board 204 is mounted with circuit components of the power transmission device 110 and the power transmission capacitor 117. The AC adaptor 112 is externally attached. An exterior of the charging box 200 may have a height H3 (150 mm) in the Z axis direction, a width W3 (150 mm) in the Y axis direction, and a depth D3 (140 mm) in the X axis direction. The charging box 200 has a shape into which the portable thermosensitive recording apparatus 120 is easily inserted. LEDs 205A and 205B are provided on the case surface 201A which is the upper surface of the charging box 200. The LEDs 205A and 205B are disposed at both ends near the opening 201 in the Y axis direction.

The charging box 200 is made of a highly conductive metal material in order to prevent leakage of an electric wave. As a metal material, not only stainless steel but also aluminum or copper may be used.

Figure 6:
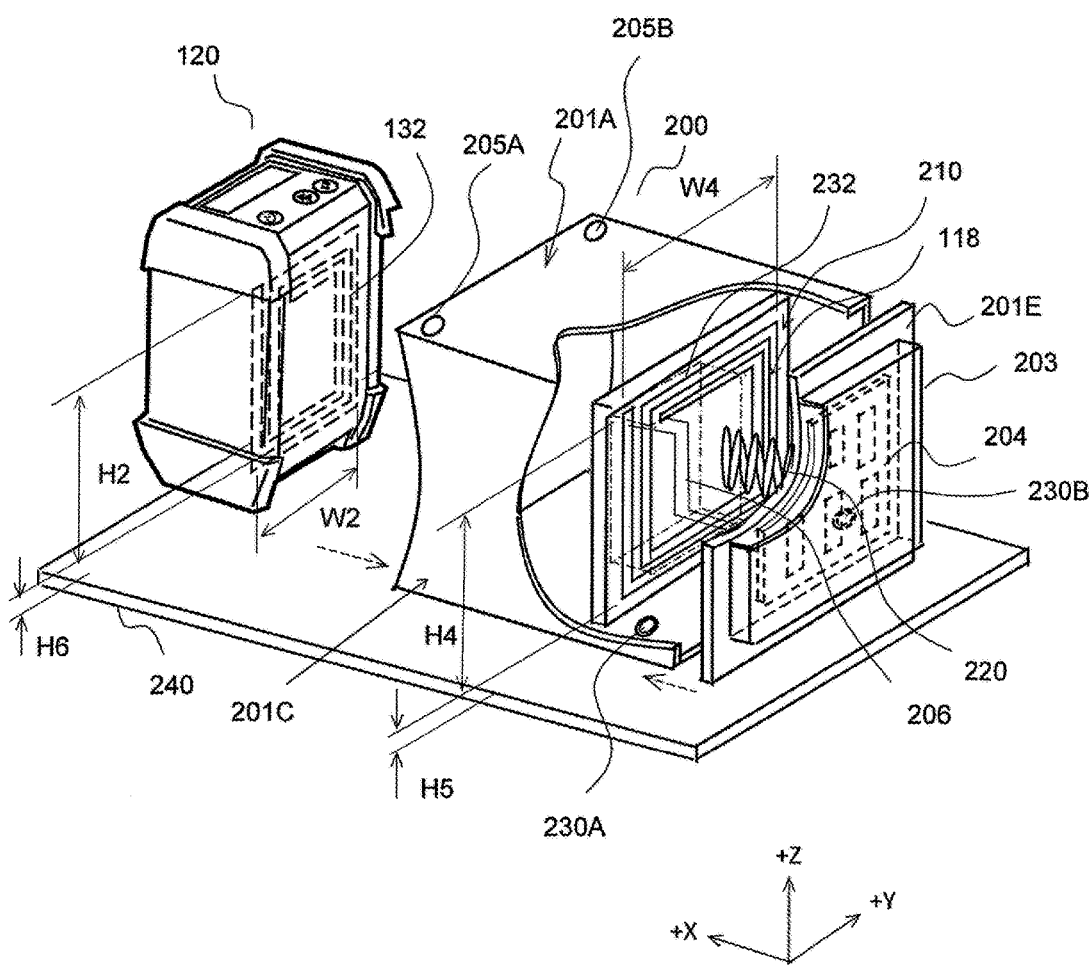
FIG. 6 is a diagram illustrating an internal configuration of the charging box.

FIG. 6 illustrates the charging box 200 disposed on a mounting surface 240, and the portable thermosensitive recording apparatus 120 inserted into the charging box 200 for noncontact charging. For better understanding of an internal configuration of the charging box 200, parts of the case surfaces 201A and 201C are removed. The power transmission coil 118 is disposed on the case surface 201E side inside the charging box 200. The power transmission coil 118 is formed in a copper foil pattern on a PC board 210 made of glass epoxy, and is a planar coil. The power transmission coil 118 may be formed in a square spiral pattern of two turns with a height H4 (60 mm) in the Z axis direction and a width W4 (55 mm) in the Y axis direction. A height H5 of the power transmission coil 118 in the Z axis direction from the mounting surface 240 is substantially the same as a height H6 of the power reception coil 132 of the portable thermosensitive recording apparatus 120 from the mounting surface 240. Each of the heights H5 and H6 is 20 mm. An end of the pattern of the power transmission coil 118 is connected to the power transmission capacitor 117 via a wiring 206.

The power transmission coil 118 may be formed in the pattern of two turns having the height H4 and the width W4, and the power reception coil 132 is formed in the pattern of two turns having the height H2 and the width W2. The heights H4 and H2 are set to the same value, and a value of the width W4 is greater than a value of the width W2. When the portable thermosensitive recording apparatus 120 is inserted into the power reception box 200, the center of the power transmission coil 118 and the center of the power reception coil 132 may undergo a slightly positional deviation in the Y axis direction. Since the width W4 is set to a value greater than a value of the width W2, even in a case where a positional deviation occurs in the Y axis direction, power can be sent from the power transmission coil 118 to the power reception coil 132 in a state in which power transmission efficiency is maintained.

A spring 220 is provided between the case surface 201E and the PC board 210 on which the pattern of the power transmission coil 118 is formed. One end of the spring 220 is fixed to the PC board 210 so as to press the substantial center of the power transmission coil pattern formed on the PC board 210 in the direction of the opening 201. The other end of the spring 220 is fixed to the case surface 201E such that a central line of the spring 220 is substantially parallel to the case surface 201D. The spring 220 supports the PC board 210 in a swingable manner. In a case where the portable thermosensitive recording apparatus 120 is inserted into the charging box 200, the portable thermosensitive recording apparatus 120 is butted against the PC board 210 via a spacer 232. Even if the portable thermosensitive recording apparatus 120 is inserted in a slightly inclined manner, the PC board 210 is butted against the portable thermosensitive recording apparatus 120 by the spring 220. As a result, the power reception coil 132 and the power transmission coil 118 can be caused to face each other in parallel to each other while a predetermined distance therebetween is maintained.

The spring 220 is an elastic body such as a coil spring or a plate spring. A rubber may be used as another elastic body. The spring 220 has a selected predetermined spring constant. The spring constant is selected to generate force enough to move the power transmission coil 118 to the opening 201 side in a case where the portable thermosensitive recording apparatus 120 is not put, and is selected to generate force enough not to move the portable thermosensitive recording apparatus 120 in a case where the portable thermosensitive recording apparatus 120 is put.

Position detection sensors 230A and 230B are provided between the PC board 210 and the case surface 201E of the charging box 200. The position detection sensors 230A and 230B are disposed at both ends in the Y axis direction inside the charging box 200. Each of the position detection sensors 230A and 230B is the same limit switch. The portable thermosensitive recording apparatus 120 is inserted into the charging box 200 so as to be in pressure contact with the PC board 210. The position detection sensors 230A and 230B detect a position of the PC board 210. In other words, positions of the power transmission coil 118 and the power reception coil 132 are detected. The sensors 230A and 230B are turned on when the sensors 230A and 230B are brought into contact with the PC board 210, and are turned off when the sensors are separated from the PC board 210.

Figure 7:
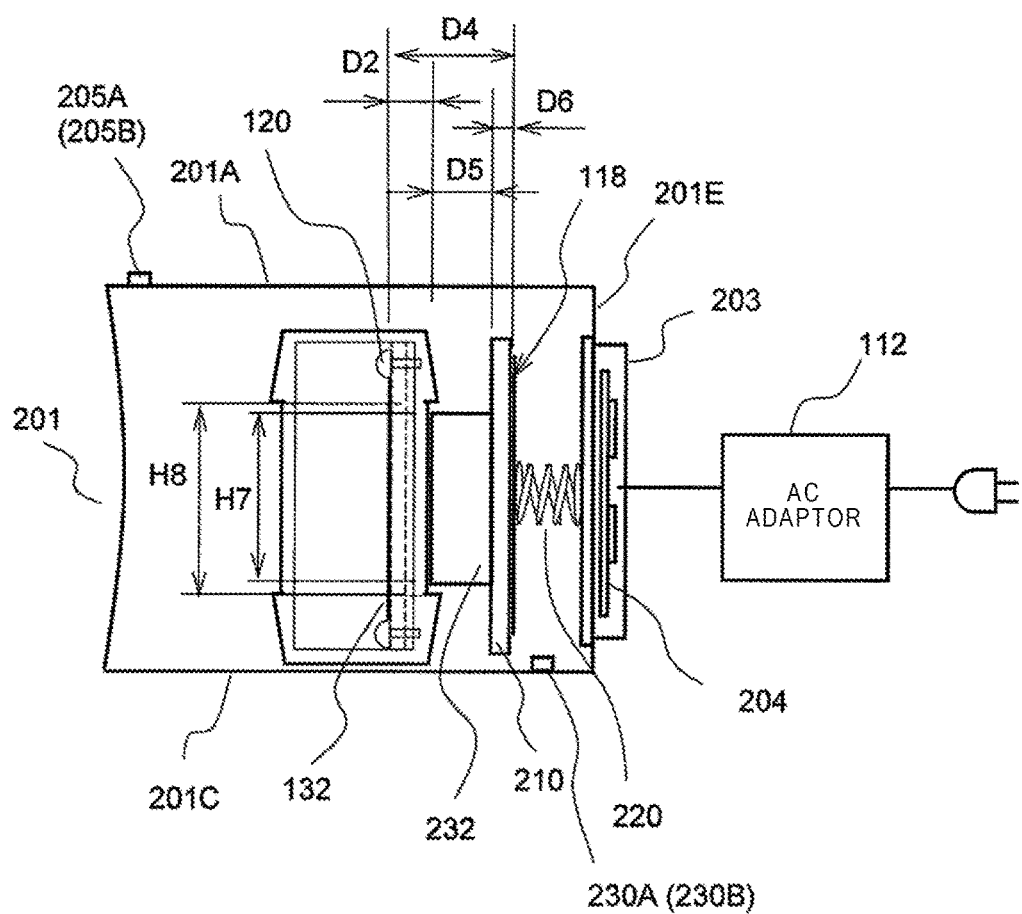
FIG. 7 is a sectional view illustrating an internal configuration of the charging box.

FIG. 7 illustrates sections of the portable thermosensitive recording apparatus 120 and the charging box 200. The spacer 232 is provided on the PC board 210 on the opening 201 side. The spacer is made of a resin, and has a thickness (D5) of 12 mm, and a height (H7) of 40 mm. The PC board 210 has a thickness (D6) of 2 mm. The portable thermosensitive recording apparatus 120 is inserted from the opening 201 and is pushed until being brought into contact with the spacer 232. The spacer 232 is brought into contact with a surface (a height (H8) of 45 mm) of the portable thermosensitive recording apparatus 120, and thus the spring 220 is contracted. Consequently, a distance D4 between the power transmission coil 118 and the power reception coil 132 is maintained to be constant. The distance D4 is set to 20 mm. The spacer 232 is in contact with the case of the portable thermosensitive recording apparatus 120 such that the distance D4 is maintained at an appropriate value.

As illustrated in FIG. 6, in a case where the portable thermosensitive recording apparatus 120 is put into the charging box 200 so as to be butted against the power transmission coil 118, and is then further pressed inward, the PC board 210 on which the power transmission coil 118 is formed is moved toward the inner surface. If the portable thermosensitive recording apparatus 120 reaches the position detection sensors 230A and 230B, states of the sensors 230A and 230B are switched. When the states of the sensors 230A and 230B are switched, the power transmission coil 118 and the power reception coil 132 are located at appropriate positions with the spacer 232 interposed therebetween, and mutually apply force to each other due to the spring 220. The power transmission side control unit 114 lights the LEDs 205A and 205B so as to show to the outside of the charging box 200 a state in which the power transmission coil 118 and the power reception coil 132 are chargeable. In other words, lighting of the LEDs 205A and 205B indicates that the portable thermosensitive recording apparatus 120 is located at a chargeable position. After the LEDs 205A and 205B are lit, power starts to be transmitted from the power transmission coil 118 to the power reception coil 132. In the present exemplary embodiment, a single LED may indicate that the portable thermosensitive recording apparatus 120 is located at a chargeable position instead of the two LEDs 205A and 205B.

Figure 8:
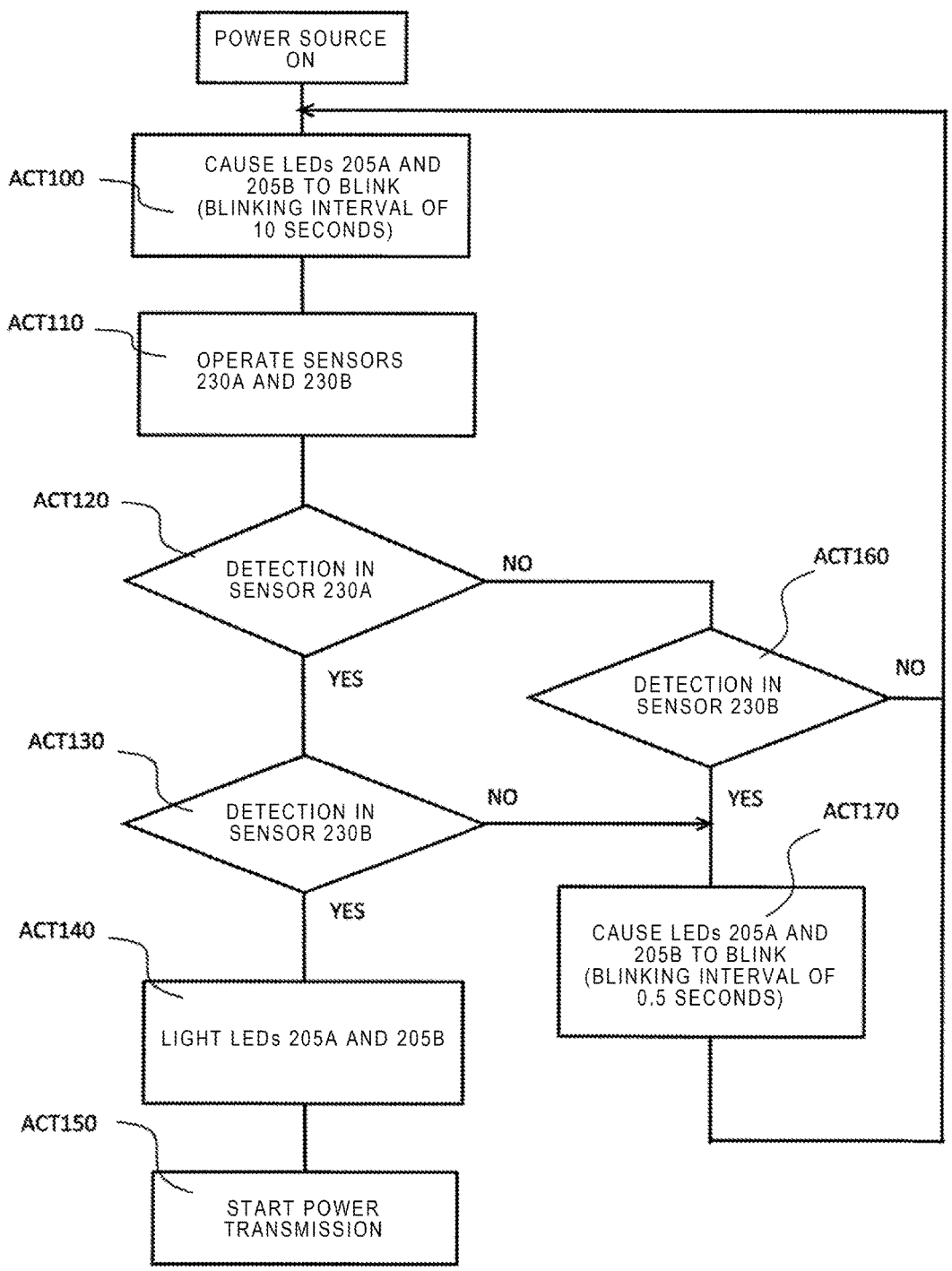
FIG. 8 is a flowchart illustrating control during noncontact charging.

FIG. 8 is a flowchart illustrating that the power transmission side control unit 114 of the charging box 200 controls the power transmission device 110 so as to start power transmission (charging). As illustrated in FIGS. 6 and 7, the charging box 200 has a configuration in which the sensors 230A and 230B detecting a position of the PC board 210 on which the power transmission coil 118 is formed are respectively provided on the left and right of the inside.

If power is supplied to the charging box 200 from the AC adaptor 112, the display unit (LEDs 205A and 205B) is controlled to normally blink at an interval of 10 seconds (ACT 100). In ACT 110, the power transmission side control unit 114 operates the sensors 230A and 230B. The portable thermosensitive recording apparatus 120 is inserted into the charging box 200, and the portable thermosensitive recording apparatus 120 is butted against the PC board 210. In a case where the PC board 210 turns on the sensor 230A (YES in ACT 120), it is subsequently detected whether the sensor 230B is turned on or off (ACT 130). In a case where the sensor 230B is turned on (YES), the sensors 230A and 230B are turned on, and the power transmission side control unit 114 determines that the power transmission coil 118 and the power reception coil 132 are located at positions suitable for noncontact power transmission. In other words, a distance between the power transmission coil 118 and the power reception coil 132 is the distance D4. Next, blinking of the LEDs 205A and 205B is stopped, and the LEDs 205A and 205B are lit (ACT 140). Lighting of the LEDs 205A and 205B indicates that noncontact power transmission can be performed. Power starts to be transmitted from the power transmission coil 118 to the power reception coil 132 according to the lighting of the LEDs 205A and 205B (ACT 150). The portable thermosensitive recording apparatus 120 charges the secondary battery 153 built thereinto through the noncontact power transmission.

On the other hand, in a case where the sensor 230A does not detect the PC board 210 (NO in ACT 120), the power transmission side control unit 114 detects a state of the sensor 230B (ACT 160). In a case where the sensor 230A does not detect the PC board 210, and the sensor 230B detects the PC board 210 (YES in ACT 160), the power transmission side control unit 114 causes the LED 205A to blink at a time interval of 0.5 seconds. In a case where the sensor 230A detects the PC board 210, and the sensor 230B does not detect the PC board 210 (NO in ACT 130), the power transmission side control unit 114 causes the LED 205B to blink at a time interval of 0.5 seconds. In a case where the LEDs 205A and 205B blink in a long cycle (interval of 10 seconds), this indicates that the charging box 200 is in a standby state for charging the portable thermosensitive recording apparatus 120. In a case where the LEDs 205A and 205B blink in a short cycle (an interval of 0.5 seconds), this indicates a state in which the portable thermosensitive recording apparatus 120 is obliquely inserted into the charging box 200 and thus cannot be charged. In a case where the LEDs 205A and 205B are continuously lit, this indicates that the charging box 200 is charging the portable thermosensitive recording apparatus 120. Blinking at a short interval attracts user's attention such that the portable thermosensitive recording apparatus 120 is placed at an appropriate position. Text is displayed on a display 250 such that the user places the portable thermosensitive recording apparatus 120 at an appropriate position. Power transmission is not performed, and thus charging of the secondary battery is not performed, before the user places the portable thermosensitive recording apparatus 120 at the appropriate position.

When neither of the sensor 230A nor the sensor 230B detects the PC board 210 (NO in ACT 160), both of the LEDs 205A and 205B repeatedly blink at the initial interval of 10 seconds.

Display states of the LEDs 205A and 205B are changed according to detection states in the sensors 230A and 230B, and thus the user can discriminate states (fast blinking and slow blinking) of the display units (LEDs 205A and 205B) and can thus recognize a state of the inside of the charging box 200.

Figure 9:
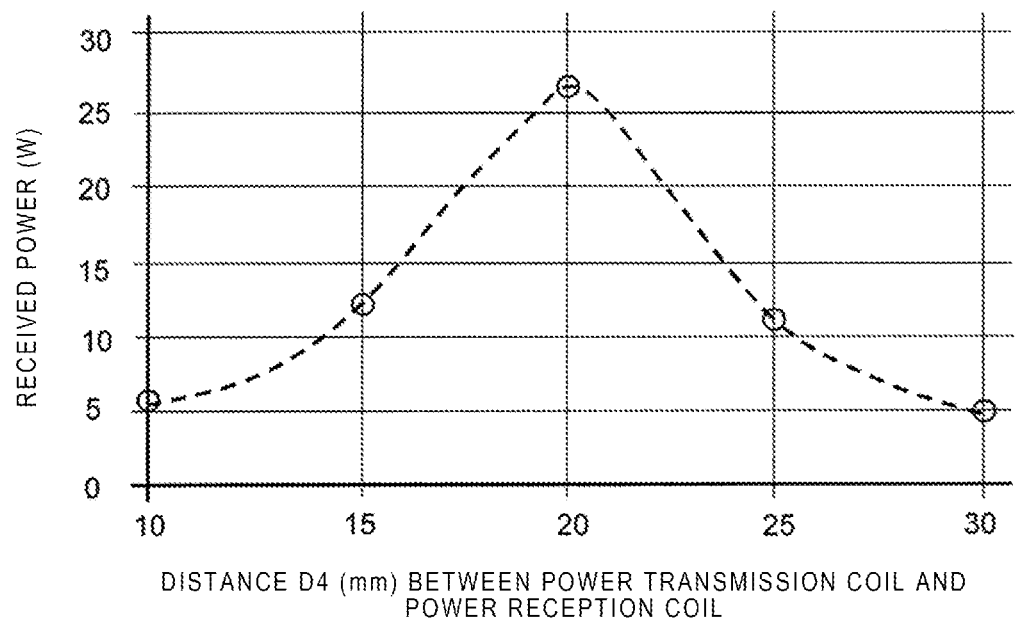
FIG. 9 is a graph illustrating a relationship between a distance between a power transmission coil and a power reception coil, and received power.

FIG. 9 illustrates examples of the distance D4 between the power transmission coil 118 and the power reception coil 132, and received power (W) obtained by the power reception device. A transverse axis expresses the distance D4 between the power transmission coil 118 and the power reception coil 132. A longitudinal axis expresses the received power (W). Power can be transmitted at the distance D4 of 10 mm to 30 mm. Preferably, received power of 20 W or more is obtained in the range of the distance D4 of 17 mm to 23 mm. The maximum received power of 26 W is obtained at the distance D4 of 20 mm. As described above, the PC board 210 including the power transmission coil 118, and the spacer 232 are butted against, via the spring 220, the side surface of the portable thermosensitive recording apparatus 120, and thus the distance D4 can be set to an optimal value. Even in a case where the portable thermosensitive recording apparatus 120 slightly obliquely inserted, the distance D4 can be maintained while the power transmission coil 118 and the power reception coil 132 are maintained to be parallel to each other by elastic force of the spring 220.

The height (H3) of the charging box 200 is provided in accordance with the height (H1) of the portable thermosensitive recording apparatus 120, and thus a noncontact charging apparatus 50 can be prevented from being tall. The charging box 200 is made of a metal material. Therefore, the charging box 200 absorbs noise, and thus radiation noise can be reduced.

The outer surfaces (201A, 201B, 201C, 201D, and 201E) of the charging box 200 are made of metal materials and are opaque, and thus the inside of the charging box 200 cannot be seen. A contact state between the portable thermosensitive recording apparatus 120 and the spacer 232 cannot be seen, and thus it cannot be checked whether or not the portable thermosensitive recording apparatus 120 and the power transmission coil 118 are disposed to be separated from each other by an appropriate distance. In the present exemplary embodiment, whether or not the portable thermosensitive recording apparatus 120 is located at an appropriate position is detected by using the sensors 230A and 230B. In a case where the portable thermosensitive recording apparatus 120 is not disposed at an appropriate position, the display unit (LEDs 205A and 205B) prompts the user to place the portable thermosensitive recording apparatus 120 at an appropriate position. Therefore, a distance between the power transmission coil 118 and the power reception coil 132 can be maintained to be constant, and thus power can be transmitted from the charging box 200 to the portable thermosensitive recording apparatus 120 with high efficiency.

Second Exemplary Embodiment

Figure 10:
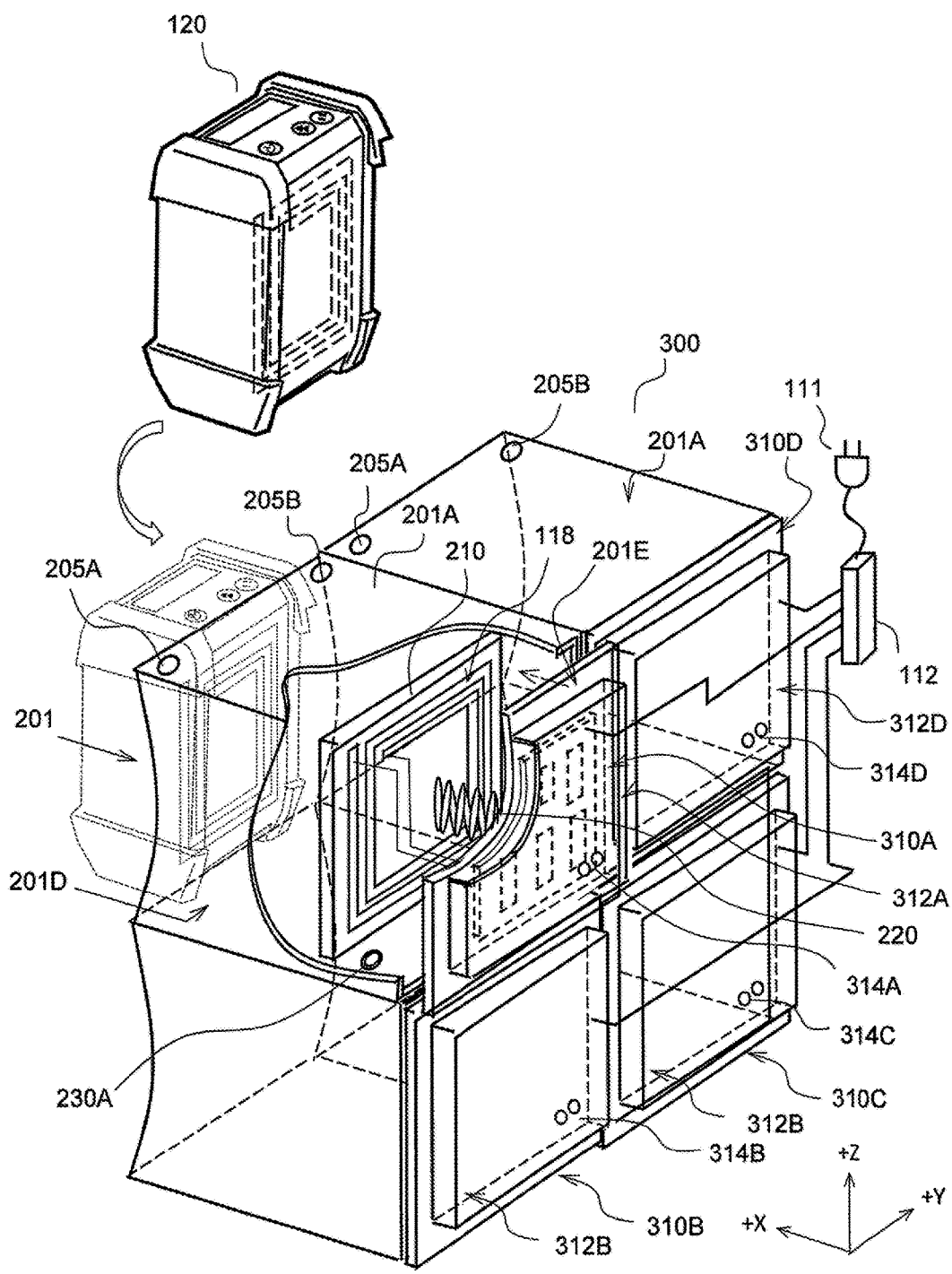
FIG. 10 is a diagram illustrating a noncontact power transmission apparatus according to a second exemplary embodiment.

FIG. 10 illustrates a noncontact power transmission apparatus 300 according to a second exemplary embodiment. The noncontact power transmission apparatus 300 includes four charging boxes 200 (310A, 310B, 310C, and 310D) of the first exemplary embodiment. The charging boxes 310B and 310C are disposed in the Y axis direction. The charging box 310A is disposed on the charging box 310B in the gravitational direction, and the charging box 310D is disposed on the charging box 310C in the gravitational direction. Each of the charging boxes (310A to 310D) has an opening 201 in the X axis direction, and allows the portable thermosensitive recording apparatus 120 to be inserted thereinto through the opening 201. The four charging boxes (310A to 310D) are integrally fixed to form a charging rack. In the present exemplary embodiment, four charging boxes (310A to 310D) are exemplified. The present exemplary embodiment is not limited to four charging boxes, and more charging boxes may be integrally configured.

The charging boxes (310A to 310D) have the same configuration. For better understanding of an internal configuration of the charging box 310A, parts of the case surfaces 201A and 201D in the drawing are removed. The power transmission coil 118 is disposed on the case surface 201E side inside the charging box 310A. A spring 220 is provided between the case surface 201E and the PC board 210 on which the pattern of the power transmission coil 118 is formed. One end of the spring 220 is fixed to the case surface 201E, and the other end thereof is fixed to the PC board 210. The spring 220 supports the PC board 210 in a swingable manner.

In the charging box 310A, a case 312A provided with clock input and output terminals 314A is provided on the rear surface 201E. A transmission circuit is provided between the case 312A and the rear surface 201E. The clock input and output terminals 314A are connected to a power transmission control unit of the transmission circuit. Similarly, the charging boxes (310B to 310D) respectively include clock input and output terminals (314B to 314D). The clock input and output terminals (314A to 314D) are operated according to the same clock signal. In other words, each charging box is operated according to a signal with a phase generated on the basis of a reference clock signal.

Since an operation is performed according to the same clock signal, the occurrence of noise can be suppressed, and thus stable noncontact power transmission is possible. The respective charging boxes (310A to 310D) are operated in synchronization with each other, so that phases of electric waves transmitted from the respective power transmission coils 118 of the charging boxes (310A to 310D) are aligned, and thus the occurrence of noise can be suppressed.

Each power transmission coil 118 of the charging boxes (310A to 310D) is formed on the Y-Z plane. Magnetic flux generated from the power transmission coil 118 is generated in a direction orthogonal to the gravitational direction. In other words, magnetic flux generated from each power transmission coil 118 is generated in the X axis direction. In a case where the power transmission coil is disposed on the X-Y plane, and the charging boxes overlap each other in the Z axis direction, magnetic flux generated from the power transmission coil is directed in the Z axis direction, and thus interference may occur between two power transmission coils. In contrast, in the second exemplary embodiment, it is possible to reduce electric wave interference among the charging boxes (310A to 310D).

The noncontact power transmission apparatus of the second exemplary embodiment achieves the same effect as that of the noncontact power transmission apparatus of the first exemplary embodiment.

In a case where each of the four charging boxes (310A to 310D) charges the same type of portable thermosensitive recording apparatus 120, the same spacer 232 is provided in each of the four charging boxes (310A to 310D). The same spacer 232 is not necessarily required to be provided in each of the four charging boxes (310A to 310D). As an example, a case is assumed in which the charging boxes 310A and 310B charge the portable thermosensitive recording apparatus 120, and the charging boxes 310C and 310D charge a portable thermosensitive recording apparatus 121 having a case shape which is different from that of the portable thermosensitive recording apparatus 120. The above-described spacer 232 is provided in the charging boxes 310A and 310B, and a spacer formed in accordance with the case shape of the portable thermosensitive recording apparatus 121 is provided in the charging boxes 310C and 310D. Consequently, different types of portable thermosensitive recording apparatuses can be simultaneously charged.

Third Exemplary Embodiment

Figure 11:
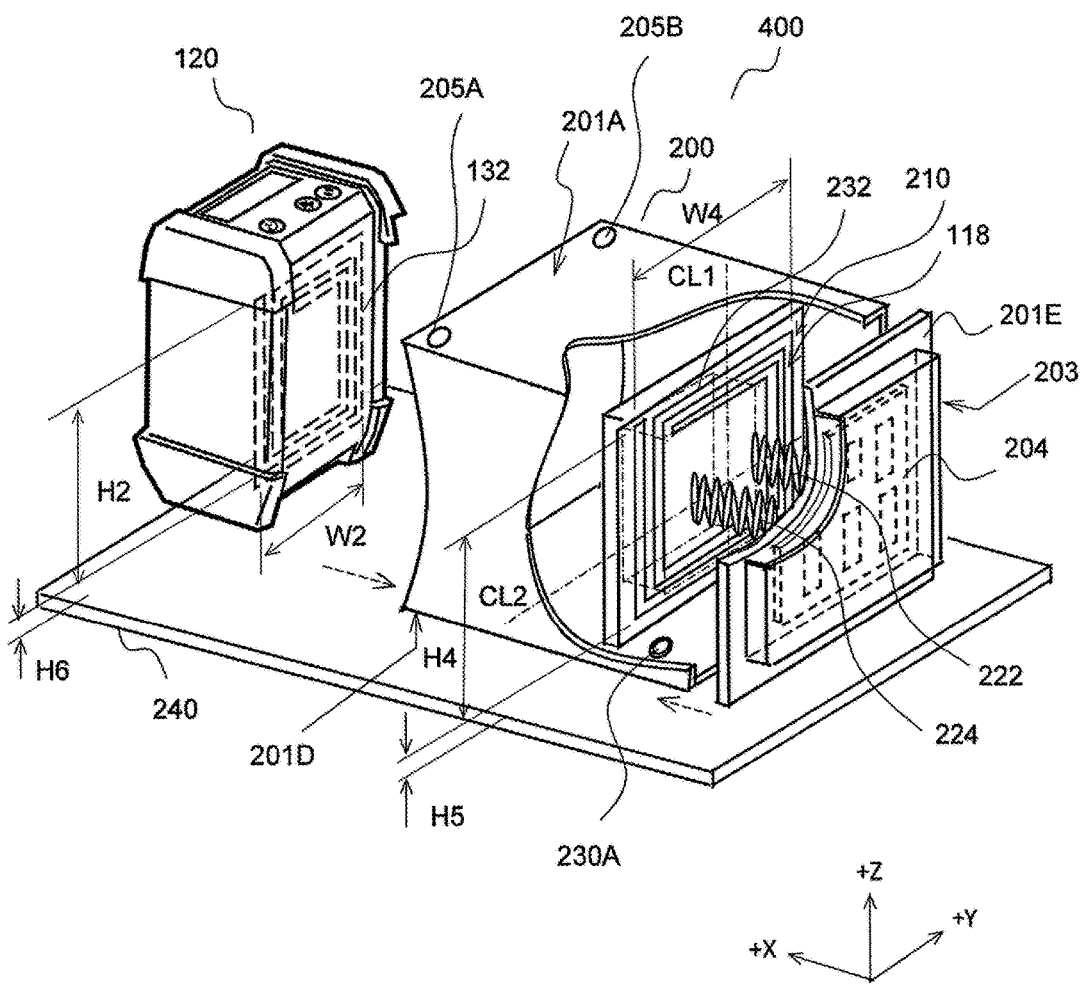
FIG. 11 is a diagram illustrating a noncontact power transmission apparatus according to a third exemplary embodiment.

FIG. 11 illustrates a noncontact power transmission apparatus 400 according to a third exemplary embodiment. In the charging box 200 of the noncontact power transmission apparatus 400, the PC board 210 provided with the power transmission coil 118 is supported by two springs 222 and 224. The charging box 200 of the third exemplary embodiment has the same configuration as that of the charging box 200 of the first exemplary embodiment except that the springs 222 and 224 are provided.

The springs 222 and 224 are provided between the case surface 201E and the PC board 210 on which the pattern of the power transmission coil 118 is formed. The power transmission coil 118 may be formed in a square spiral pattern of two turns. A central line of the Y axis direction width W4 of the pattern is indicated by CL1, and a central line of the Z axis direction height H4 is indicated by CL2. One ends of the springs 222 and 224 on the power transmission coil 118 side are fixed onto the central line CL2 at symmetric positions with the central line CL1 interposed therebetween. The other ends of the springs 222 and 224 on the case surface 201E side are fixed to the case bottom surface 201D such that the central lines of the springs 222 and 224 are substantially parallel to each other.

The springs 222 and 224 support the PC board 210 in a swingable manner. In a case where the portable thermosensitive recording apparatus 120 is inserted into the charging box 200, the portable thermosensitive recording apparatus 120 is butted against the PC board 210 via a spacer 232. In the same manner as in the first exemplary embodiment, even if the portable thermosensitive recording apparatus 120 is inserted in a slightly inclined manner, the PC board 210 is butted against the portable thermosensitive recording apparatus 120 by the springs 222 and 224. As a result, the power reception coil 132 and the power transmission coil 118 can be caused to face each other in parallel while a predetermined distance therebetween is maintained.

In addition to a portable thermosensitive recording apparatus, the noncontact power transmission apparatus is applicable to a mobile phone, a personal data assistance (PDA), an electric shaver, and the like.

While certain embodiments have been described, these embodiments have been presented byway of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A noncontact power transmission apparatus comprising:
   an instrument comprising:
      a first case,
      a power reception coil arranged to generate an induced current due to magnetic flux in a first direction intersecting a gravitational direction, and
      a holder configured to hold the power reception coil at a predetermined distance from an outer surface of the first case in the first case; and
   a power transmission device comprising:
      a conductive second case having an opening into which the instrument is inserted and in which the instrument is stored,
      a power transmission coil disposed in the second case so as to generate magnetic flux in the first direction, and arranged to generate an induced current in the power reception coil, and
      an elastic body disposed in the second case, and arranged to maintain a distance between the power transmission coil and the power reception coil to be constant, and to support the power transmission coil.

2. The apparatus according to claim 1, wherein the instrument is a portable thermosenstive recording apparatus.

3. A power transmission device configured to transmit power to an instrument comprising a first case, a power reception coil arranged to generate an induced current due to magnetic flux in a first direction intersecting a gravitational direction, and a holder configured to hold the power reception coil at a predetermined distance from an outer surface of the first case in the first case, in a noncontact manner, the device comprising:
- a conductive second case having an opening into which the instrument is inserted and in which the instrument is stored;
- a power transmission coil disposed in the second case so as to generate magnetic flux in the first direction, and arranged to generate an induced current in the power reception coil; and
- an elastic body disposed in the second case, and arranged to maintain a distance between the power transmission coil and the power reception coil to be constant, and to support the power transmission coil.

4. The device according to claim 3, further comprising:
a first capacitor connected to the power transmission coil;
a power transmission unit configured to transmit power via the power transmission coil and the first capacitor;
a sensor configured to detect a position of the power transmission coil; and
a controller configured to control the power transmission unit according to an output from the sensor.

5. The device according to claim 3,
wherein the power transmission coil includes a spacer arranged to maintain a distance between the power transmission coil and the power reception coil in the first direction to be constant.

6. The device according to claim 3,
wherein a plurality of the power transmission devices are provided, at least two of the power transmission devices are stacked to overlap each other in the gravitational direction.

7. The device according to claim 6, wherein the plurality of power transmission devices are operated in synchronization with each other.

8. The device according to claim 3, wherein the elastic body is one of a spring or a rubber.

9. The device according to claim 3, further comprising:
a sensor configured to detect a position of the power transmission coil.

10. The device according to claim 9, further comprising:
a display; and
a controller configured to control the display according to an output from the sensor.

11. The device according to claim 10, wherein the controller is configured to control the display to indicate that the power reception coil is chargeable by the power transmission coil when the output from the sensor indicates that the power reception coil and the power transmission coil are at a position suitable for noncontact power transmission.

12. The device according to claim 10, wherein the controller is configured to control the display to indicate that the power reception coil is not chargeable by the power transmission coil when the output from the sensor indicates that the power reception coil and the power transmission coil are not at a position suitable for noncontact power transmission.

13. The device according to claim 10, wherein the sensor comprises a first sensor and a second sensor, the controller is configured to control the display to indicate that the power reception coil is chargeable by the power transmission coil when the output from both the first sensor and the second sensor indicates that the power reception coil and the power transmission coil are at a position suitable for noncontact power transmission.

14. The device according to claim 10, wherein the sensor comprises a first sensor and a second sensor, the controller is configured to control the display to indicate that the power reception coil is not chargeable by the power transmission coil when the output from either the first sensor or the second sensor indicates that the power reception coil and the power transmission coil are not at a position suitable for noncontact power transmission.

15. The device according to claim 3, wherein the elastic body comprises two springs arranged laterally with respect to each other.

16. A method of aligning a power reception coil of an instrument with a power transmission coil of a power transmission device, comprising:
- inserting the instrument into a conductive case of the power transmission device;
- determining whether or not the power reception coil and the power transmission coil are at a position suitable for noncontact power transmission based on an indication from a position sensor; and
- providing noncontact power transmission from the power transmission coil to the power reception coil, when it is determined that the power reception coil and the power transmission coil are at a position suitable for noncontact power transmission.

17. The method of claim 16, further comprising:
controlling a display to indicate that the power reception coil is chargeable by the power transmission coil when it is determined that the power reception coil and the power transmission coil are at a position suitable for noncontact power transmission.

* * * * *